Nov. 8, 1949 R. T. CLOUD 2,487,695
ELECTRIC HEATING ELEMENT
Filed Nov. 29, 1946

Inventor
RAYMOND T. CLOUD
by
Attys.

UNITED STATES PATENT OFFICE 2,487,695

ELECTRIC HEATING ELEMENT

Raymond T. Cloud, Houston, Tex., assignor to North American Geophysical Company, Houston, Tex., a corporation of Texas Application November 29, 1946, Serial No. 712,757

6 Claims. (Cl. 201—73)

This invention relates to an electric heating element, and particularly to a heating element for temperature controlled enclosures wherein an extremely high degree of accuracy of temperature control must be maintained within the enclosure.

There are many devices wherein it is necessary to maintain the temperature within a compartment or enclosure at a fixed value with as high a possible degree of accuracy. This problem is particularly important in precision scientific instruments, such, for example, as a gravity meter.

The high degree of accuracy of temperature regulation required in a modern gravity meter becomes apparent when it is considered that such meters are required to make measurements of the force of gravity to a probable error on the order of $2 \times 10^{-8}$ of the normal force of gravity. In order to achieve measurements of this order of accuracy, it is essential that the variations in the physical dimensions of the parts that make up the gravity meter due to temperature do not exceed such order of magnitude. For the usual materials used in construction of such instruments, the temperature expansion coefficients are of the order of $10^{-5}$. While every effort can be made to select materials of low coefficients of expansion and arrange them in such manner that some of the coefficients will have a negative action so that the sum of the dimension changes will be approximately zero, it is still necessary to have highly accurate temperature control to insure that all the elements of the apparatus undergo simultaneous changes in temperature.

The construction which has heretofore been used for obtaining an even distribution of temperature in the physical elements of a gravity meter is to provide an enclosure in which such elements are mounted and to surround such enclosure with alternating layers of high and low heat conductivity material, and provide one or more thermostatically controlled heating elements disposed in heat transfer relationship on the outside of the high heat conductivity material. Heretofore it has been customary to provide a heating element in the form of a wire which is doubled and then wound about the exterior of the temperature control enclosure so that, when energized by a suitable source of voltage, the inductive effects of the current flow through the heating wire are substantially neutralized.

I have observed that such utilization of wires does not produce exactly uniform temperature conditions within the temperature controlled enclosure. I have further determined that the primary reason for variations in temperature of one portion of the temperature control enclosure with respect to another portion lies in the fact that the cylindrical configuration of the heating wire and the spacing between turns thereof naturally produces a heat flow pattern in the heat conducting walls of the enclosure wherein the isothermal lines have a wavy and irregular configuration, bending toward the outside of the wall in those portions opposite the spaces between the turns of the heating wire and bending toward the inside of the wall at those portions opposite the turns of the heating wire. As a result, alternate portions of the interior surface of the wall of the temperature controlled enclosure will be at approximately the same temperature while the intermediate portions will be at a lower temperature. Such conditions naturally produce a variation of temperature throughout the entire interior of the temperature controlled enclosure.

It is a feature of this invention that an electrical heating element is provided which is of sheet-like configuration and conforms to the surface of the mass to be heated, such for example as the walls of the temperature controlled enclosure, and that the flow of heating current takes place substantially throughout the entire area of such sheet. As a result, the isothermal lines produced by the heat flow through the wall of the temperature controlled enclosure are substantially straight lines and hence the entire interior surface of such walls will be at substantially the same temperature, thereby securing uniformity of temperature throughout the temperature controlled enclosure.

A further feature of this invention is the provision of an electrical heating element of sheet-like configuration wherein a pair of substantially identical current flow circuits are defined in opposed relationship and the current flow through one of such circuits is reversed from that in the other circuit and hence all inductive effects of the current flow are eliminated. This insures that there will be no appreciable uncontrolled heating effects such as produced by eddy currents in the mass being heated.

A further feature of this invention is the provision of an improved method for fabricating a sheet-like element such as heretofore described. The method of embodying this invention permits such element to be formed in economical fashion by stamping and folding operations upon a sheet of electrically conducting material.

Accordingly, it is an object of this invention to provide an improved electrical heating element.

A further object of this invention is to provide an improved electrical heating element of sheet-like configuration wherein current flow occurs substantially through all the area of the sheet and an isothermal distribution of heat flow through a mass to be heated may be produced.

Another object of this invention is to provide an improved heating element capable of producing substantially isothermal distribution of heat flow in an adjacent mass wherein the flow of heating current occurs reversely through two identical current flow circuits disposed in superposed relationship.

A further object of this invention is to provide an economical method for fabricating a sheet-like, non-inductive electrical heating element.

The specific nature of this invention, as well as other objects and advantages thereof, will become apparent to those skilled in the art from the following detailed description of the annexed sheet of drawings which, by way of preferred example only, illustrates one specific embodiment of the invention.

Figure 1:
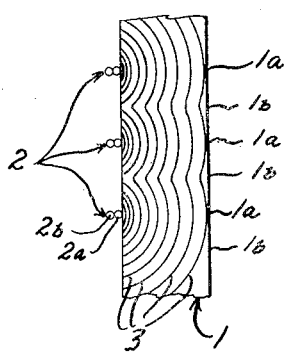
Figure 1 is a schematic illustration of a conventional form of wire heating element disposed in cooperative relationship with a mass to be heated and illustrating the irregular isothermal pattern of heat flow produced in such mass.

Referring to Figure 1, the numeral 1 indicates a mass to be heated, which, for example, may comprise the wall of a temperature controlled compartment such as utilized in a gravity meter or similar precision instrument where a uniform temperature must be maintained throughout the compartment with a high degree of accuracy. The wire 2 indicates a conventional form of heating element constituting a double wound wire wherein the current flow in the wire 2a is reversed to the current flow in the wire 2b and hence the inductive effects of the current flow are substantially eliminated. As has been previously indicated, such conventional construction produces an irregular contour of isothermal lines 3 and, in particular those portions 1a of the interior surface of the wall 1 will be at a slightly higher temperature than intermediate portions 1b due to such irregular isothermal pattern inherently produced by the wire 2.

Figure 2:
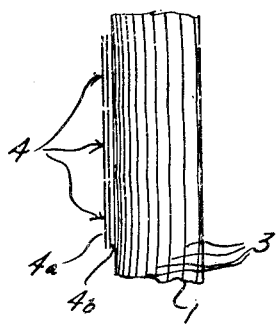
Figure 2 is a view similar to Figure 1 but illustrating the isothermal heat flow pattern produced by a heating element embodying this invention.

Now, in accordance with this invention, in place of the wire 2, the heating element is constructed to provide a cross-sectional configuration indicated by the conducting element 4 in Figure 2. Such conducting elements are of substantially sheet-like form and are mounted on the outer surface of the wall 1 to conform closely thereto. Each conducting element 4 is formed of two identical parts 4a and 4b, respectively, and the current direction to the conducting element 2 is such that the current flow through the part 4a is reverse from that in the part 4b. As a result, all inductive effects of current flow in the heating element 4 are substantially eliminated. With a heating element, such as shown in Figure 2, the isothermal pattern of heat flow through the wall 1 is of more regular configuration and substantially approaches straight lines adjacent the interior surface of the wall 1. As a result, the interior surface of the wall 1 will all be at substantially the same temperature and hence the temperature distribution within the temperature control compartment defined by the wall 1 will be uniform to a high degree of accuracy.

Figure 3:
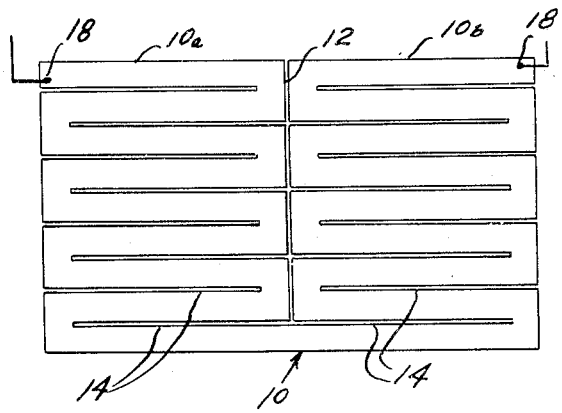
Figure 3 is an elevational view of the sheet from which a heating element embodying this invention is initially fabricated, showing the condition of the sheet after the stamping operation.
Figure 4:
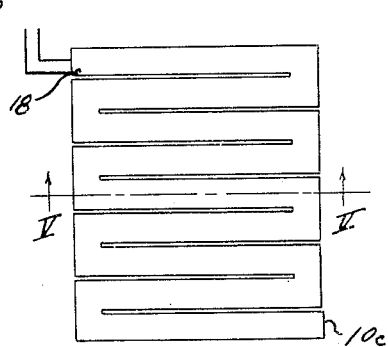
Figure 4 is an elevational view of a completed heating element embodying this invention.
Figure 5:
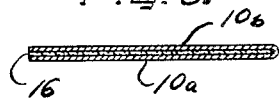
Figure 5 is a transverse sectional view taken along the plane V—V of Figure 4.

A heating element embodying the aforedescribed characteristics of the element 4 may be conveniently formed by stamping operations on a sheet of electrically conductive material. Referring to Figure 3, there is shown a sheet 10 of electrically conductive material, whose resistivity is suitable to produce the amount of heating effect desired at the required voltage and current flow. The sheet 10 is formed to have an area twice that desired for the finished heating element.

The sheet 10 is then centrally slit as indicated at 12, the slit running transversely from one edge of the sheet to a point immediately adjacent the other end of the sheet and dividing the sheet 10 into two substantially identical half sheet portions 10a and 10b, respectively. Each half sheet portion is then provided with a plurality of spaced slits 14 and alternate slits communicate respectively with the central slit 12 and with the outer transverse edge of each half sheet. The arrangement of the slits 14 in each of the half sheets 10a and 10b is in mirror image reversed relationship with respect to each other. Slits 14 as well as the central slit 12 may be conveniently formed concurrently in a single stamping operation. Sheet 10 is then folded in alignment with the central slit 12 and the half sheets 10a and 10b are then disposed in superposed relationship. Due to the mirror image relationship of the slits 14 in each of the half sheets, when the half sheets 10a and 10b are thus superposed, they will define a pair of identical superposed current flow circuits which are interconnected only by the folded portion 10c of the original sheet 10. The adjacent faces of each of the half sheets 10a and 10b are electrically insulated from each other by an interposed layer of insulating material 16. Such insulating material may conveniently comprise a coating of insulating enamel applied to one or both of the adjacent surfaces of the half sheets.

Any desired form of terminal connections 18 are provided for the non-connected ends of the current flow circuits defined in the half sheets 10a and 10b by the slits 14. When a suitable heating voltage is applied across the terminals 18, the current flow in each half sheet will follow identical tortuous paths, including substantially all of the area of the half sheet and will be reversed in direction at each point in one half sheet with respect to the current flow at the same superposed point in the other half sheet.

The finished heating element may be readily applied to the surface of any mass to be heated and will produce isothermal heat flow characteristics in such mass similar to those illustrated in Figure 2. Since the complete heating element is generally of very small thickness dimension, it may be readily deformed to conform to any irregularities in the exterior wall surface of the mass to be heated and hence the desirable advantages of the heating element embodying this invention may be obtained equally well in a temperature controlled enclosure having walls of arcuate or other non-planar exterior configuration.

The described method of fabrication of the heating element assures that such element may be economically produced in large quantities and successively produced heating elements will have substantially identical characteristics.

It will, of course, be understood that various details in construction may be varied through a wide range without departing from the principles of this invention and it is, therefore, not the purpose to limit the patent granted hereon otherwise necessitated by the scope of the appended claims.

I claim as my invention:

1. A non-inductive electrical heating element comprising a pair of superposed identical sheets of electrical conducting material separated by a thin layer of insulation, said sheets having identical groups of slits cut therein to define a pair of identical superposed tortuous current flow circuits including all the remaining area of each sheet, means electrically connecting similar ends of said flow circuit, and terminal means for applying a voltage across the other pair of ends of said flow circuits, whereby the inductive effects of current flow in one of said sheets is substantially neutralized by current flow in the other sheet.

2. A non-inductive, electrical heating element comprising a pair of superposed identical sheets of electrical conducting material separated by a thin layer of insulation, said sheets having identical groups of slits cut therein, said slits being parallel and alternate slits extending respectively through opposite edges of each sheet to define a pair of identical superposed tortuous current flow circuits including all the remaining area of each sheet, means electrically connecting similar ends of said flow circuit, and terminal means for applying a voltage across the other pair of ends of said flow circuits, whereby the inductive effects of current flow in one of said sheets is substantially neutralized by current flow in the other sheet.

3. A non-inductive heating element comprising a sheet of electrically conducting material centrally split from one edge to a point adjacent the opposite edge and folded in alinement with said central slit to provide a pair of superposed identical half sheets, means for electrically insulating the adjacent faces of said half sheets, each of said half sheets having identical groups of slits therein defining a pair of identical tortuous current flow circuits respectively including all of the remaining area of each half sheet and connected by the folded portion of said sheet, and terminal members for applying a voltage to the non-connected ends of said circuits, whereby the inductive effects of current flow in one of said half sheets is substantially neutralized by current flow in the other half sheet.

4. A non-inductive heating element comprising a sheet of electrically conducting material centrally split from one edge to a point adjacent the opposite edge and folded in alinement with said central slit to provide a pair of superposed identical half sheets, means for electrically insulating adjacent faces of said half sheets, each of said half sheets having identical groups of slits therein, said slits being substantially perpendicular to the fold aligned edge of each half sheet, alternate slits extending respectively through said fold aligned edge and the edge opposite said fold aligned edge to define a pair of identical tortuous current flow circuits respectively including all the remaining area of each half sheet and connected by the folded portion of said sheet, and terminal means for applying a voltage to the non-connected ends of said circuits, whereby the inductive effects of current flow in one of said half sheets is substantially neutralized by current flow in the other half sheets.

5. The method of making a non-inductive heating element from a sheet of electrically conducting material comprising cutting such sheet to form a central dividing slit extending from one edge to a point adjacent the opposite edge, cutting a plurality of slits in each half sheet running generally transversely with respect to said central slit and the slits in one-half sheet being disposed in mirror image relationship to those in the other half sheet, alternate slits extending respectively through opposite edges of each half sheet, thereby defining a tortuous current flow circuit in each half sheet, and folding said sheet in alinement with the central slit to place said half sheets in superposed relationship.

6. The method of making a non-inductive heating element comprising stamping a sheet of electrically conducting material to form a central dividing slit extending from one edge to a point adjacent the opposite edge of the sheet, concurrently stamping a plurality of slits in each half sheet extending generally transversely with respect to said central slits and the slits in one half sheets being disposed in mirrow image relationship to those in the other half sheets, alternate slits extending respectively through opposite edges of each half sheet, thereby defining a tortuous current flow circuit in each half sheet, folding said sheet in alignment with the central slits to place said half sheets in superposed relationship, and insulating the adjacent faces of the half sheets.

RAYMOND T. CLOUD.

REFERENCES CITED

The following references are of record in the file of this patent:

UNITED STATES PATENTS

| Number | Name | Date |
|---|---|---|
| 953,393 | Parkhurst | Mar. 29, 1910 |
| 996,758 | Hadaway | July 4, 1911 |
| 1,143,574 | Denhard | June 15, 1915 |
| 2,164,913 | Goodchild | July 4, 1939 |